Jan. 5, 1926.                                              1,568,581
J. A. ALBERT
TIRE ARMOR
Filed August 30, 1924
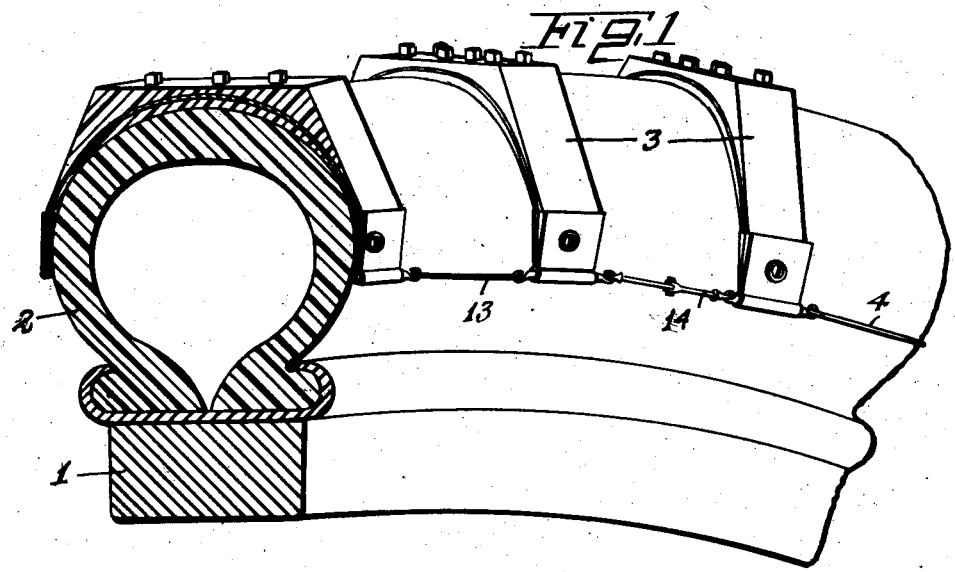
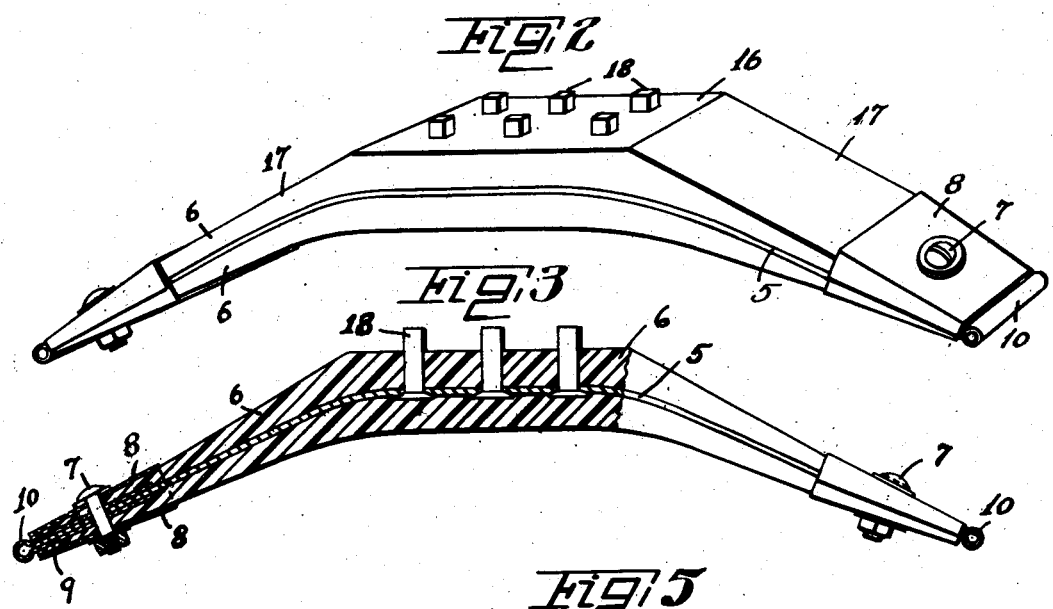
Inventor
Joseph A. Albert
By Attorney Patented Jan. 5, 1926.

1,568,581

UNITED STATES PATENT OFFICE.

JOSEPH A. ALBERT, OF SPRINGFIELD, MASSACHUSETTS.

TIRE ARMOR.

Application filed August 30, 1924. Serial No. 735,065.

*To all whom it may concern:*

Be it known that I, JOSEPH A. ALBERT, a subject of George V, King of England, residing at Springfield, county of Hampden, Commonwealth of Massachusetts, have invented certain new and useful Improvements in Tire Armors, of which the following is a specification.

This invention relates to tire armor, and consists in the novel construction and assembly of parts described and illustrated in the accompanying specification and drawings, and particularly pointed out in the appended claims. In the drawings:—

Fig. 1 is a fragmentary perspective view of a pneumatic tire equipped with armor in accordance with my invention.

Fig. 2 is a perspective view of one of the armor units, removed.

Fig. 3 is a longitudinal section thereof, and

Figs. 4 and 5 are details of the link connections.

I have indicated at 1 a felly and at 2 a pneumatic tire of standard type.

According to my invention, the tread of the tire is protected by a plurality of spaced transversely disposed armor units indicated generally at 3, which are assembled upon the tire in the relation shown in Fig. 1, wherein said units are illustrated as substantially conforming in curvature to the rounded tread of the tire and as connected to each other at their ends by the circumferentially extending series of flexible connections 4 which lie closely adjacent the side walls of the tire well below the tread thereof.

Each armor unit 3 consists of a central strip of metal 5 (Fig. 3) which is embedded within a rubber strip 6. Passing through the strips 5 and 6 adjacent either end thereof is a bolt 7 which clamps a pair of metal sheath plates 8 to the opposite faces of the rubber strip 6. Each bolt 7 also fastens the split shank 9 of a link carrier to each end of the metal strip 5 with the shank 9 of said bearing member straddling said strip 5 and the rounded tubular head 10 thereof projecting beyond the end of said strip and disposed transversely thereto so as to lie substantially circumferentially of the tire.

Fastened within said tubular heads 10 of the link carriers are links 11 (Fig. 4) provided at their ends with hooks 12 adapted to be engaged with the apertured ends of intermediate links 13, (Fig. 1), the fastening link 14 at the ends of the flexible chain connection thus provided being formed for quick detachable connection, and said link, as here shown, having a swivel joint 15 (Fig. 5) whereby the chain may be readily hooked and unhooked in applying it to and removing it from the tire.

Preferably, each armor unit is shaped to provide a central flat tread area 16 overlying the tread of the tire and downwardly inclined side 17 (Fig. 2) overlying the side walls of the tire. If desired, the outer face of the tread area 16 may be provided with traction projections 18, which as here shown are headed studs set through holes in the metal strip 5, with the heads of said studs being wedged in the rubber strip 6 below said metal strip 5 and the ends of said studs projecting upwardly beyond the plane of the traction area 16 of the tread unit 3.

In addition to their function as a protective armor, the units 3 also insure increased traction. By using a composite metal and rubber strip 3 sufficient strength is provided in the armor, while at the same time a proper cushioning and resiliency is obtained since the metal plate 5 is covered by a layer of rubber on either side, and is hence spaced both from the ground and from the fabric of the tire. The type and construction of the link connections insure that the tread units will be held against creeping on the tire while permitting quick attachment and detachment when desired.

Various modifications in the form and construction of my device may obviously be resorted to without departing from the spirit of my invention if within the limits of the appended claims.

What I therefore claim and desire to secure by Letters Patent is:

1. A tire armor, comprising a transversely arranged series of armor units, each unit including a metal strip, link carriers consisting each of a split shank straddling the ends of the metal strip and a tubular head projecting beyond the strip end and disposed transversely thereof, means fastening the link carriers to the armor units, and links fastened within said tubular heads of the link carriers and connected to each other circumferentially of the tire.

2. A tire armor comprising a transversely arranged series of armor units, each unit including a metal strip, (sheaths enclosing the ends of said armor units,) link carriers consisting each of a split shank straddling the ends of the metal strip and a tublar head projecting beyond the strip end and disposed transversely thereto, a single connection fastening both the end sheaths and the link carriers to the armor units, and links fastened within said tubular heads of the link carriers and connected to each other circumferentially of the tire.

In testimony whereof I affix my signature.

JOSEPH A. ALBERT.